(12) United States Patent
Shurmantine et al.

(10) Patent No.: US 7,554,932 B1
(45) Date of Patent: Jun. 30, 2009

(54) MESSAGE CONTROL PROTOCOL IN A COMMUNICATIONS NETWORK HAVING REPEATERS

(75) Inventors: Neal Shurmantine, Aurora, CO (US); Daryl Burkhard, Erie, CO (US); Steven T. Dunbar, Lafayette, CO (US); Donald J. Hume, Boulder, CO (US); Nathan Koonce, Lafayette, CO (US); Steve Koonce, Boulder, CO (US); Preston Pierce, Boulder, CO (US)

(73) Assignee: Inovonics Corporation, Louisville, CO (US)

( * ) Notice: Subject to any disclaimer, the term of this patent is extended or adjusted under 35 U.S.C. 154(b) by 916 days.

(21) Appl. No.: 10/882,498

(22) Filed: Jun. 30, 2004

Related U.S. Application Data

(63) Continuation-in-part of application No. 10/105,058, filed on Mar. 21, 2002, now Pat. No. 7,154,866.

(51) Int. Cl.
*H04B 7/14* (2006.01)
(52) U.S. Cl. .................. 370/279; 370/293; 370/501
(58) Field of Classification Search ................ None
See application file for complete search history.

(56) References Cited

U.S. PATENT DOCUMENTS

| | | | |
|---|---|---|---|
| 5,283,781 A | 2/1994 | Buda et al. | 370/13.1 |
| 5,331,634 A * | 7/1994 | Fischer | 370/405 |
| 5,564,070 A | 10/1996 | Want et al. | |
| 5,625,882 A | 4/1997 | Vook et al. | 455/38.3 |
| 5,673,252 A | 9/1997 | Johnson et al. | 370/94.1 |
| 5,802,467 A | 9/1998 | Salazar et al. | |
| 5,838,226 A | 11/1998 | Houggy et al. | 340/310.01 |
| 5,874,903 A | 2/1999 | Shuey et al. | 340/870.02 |
| 5,881,055 A | 3/1999 | Kondo | 370/311 |
| 5,892,758 A | 4/1999 | Argyroudis | 370/335 |
| 5,930,241 A | 7/1999 | Fried | |
| 6,239,722 B1 | 5/2001 | Colton et al. | 340/870.02 |
| 6,278,883 B1 | 8/2001 | Choi | |
| 6,310,549 B1 | 10/2001 | Loftin et al. | |
| 6,333,975 B1 | 12/2001 | Brunn et al. | 379/106.03 |
| 6,751,455 B1 | 6/2004 | Acampora | 455/414.1 |
| 6,973,071 B1 | 12/2005 | Bourk | |
| 7,016,948 B1 | 3/2006 | Yildiz | |

OTHER PUBLICATIONS

Zeus Wireless, Inc., Wireless Network Solutions, production information, www.zeuswireless.com, Nov. 15, 2000, 7 pages.

* cited by examiner

*Primary Examiner*—Chi H. Pham
*Assistant Examiner*—Soon D. Hyun
(74) *Attorney, Agent, or Firm*—Caesar, Rivise, Bernstein, Cohen & Pokotilow, Ltd.

(57) ABSTRACT

A wireless communications network which provides directed transmissions between components of the network is provided. The components within the wireless communications include a master apparatus, a plurality of remote devices, and a plurality of repeaters. The components within the wireless communications network communicate using messages which have a control field and at least one information field. Information within the control field is used by components to make determinations for retransmitting the message, or transmitting a predefined response to the message, such as a signal strength response. The components within the network use the messages to make a determination of a communications target, which may be used as a primary contact for transmitting information, automatically, and may repeat the determination at predetermined intervals. Thus, the wireless communications network is able to adapt over time to additional components added into the network, or changing environmental conditions in and around the network.

26 Claims, 10 Drawing Sheets

MESSAGE CONTROL PROTOCOL IN A COMMUNICATIONS NETWORK HAVING REPEATERS

CROSS REFERENCE TO RELATED APPLICATIONS

This patent is a continuation-in-part of U.S. patent application Ser. No. 10/105,058, filed Mar. 21, 2002 now U.S. Pat. No. 7,154,866, entitled "Message Control Protocol in a Communications Network Having Repeaters," the disclosure of which is hereby incorporated by reference herein in its entirety.

FIELD OF THE INVENTION

The present invention is directed generally to communications over a wireless communications network, and specifically to a message control protocol for a communications network having repeaters.

BACKGROUND OF THE INVENTION

A local on-site wireless monitoring network consists of remote monitoring devices, a central master device for controlling and collecting information from the remote devices, and distributed repeating devices (repeaters). The repeaters provide the means of expanding the communication coverage of the monitoring system by relaying messages to and from the remote devices and the master. Such a monitoring network is useful in many applications, such as, for example, utility meter monitoring, heating ventilation and air conditioning (HVAC) systems, and security systems.

In a simple form, the repeating network includes broadcast type repeaters that receive messages and rebroadcast the message to any other repeating device so that the message can propagate through the network, ultimately arriving at the master device. In such a system, there are no acknowledgment messages between broadcast rounds, as broadcast implies that it is not known who the intended or appropriate receiver should be. Such broadcast systems require little intelligence and are relatively easy to implement and install in practical application. However, such broadcast systems are inherently inefficient in that messages are re-broadcast redundantly in all directions and are received by other repeaters that are further away, as well as closer, to the master. Generally, the master will receive the same message multiple times from multiple paths through the network. This redundancy, although inefficient, is required to ensure a high probability of successful communication of a message from a remote device to the master through the network. In order to avoid endless loops of repeating the same message between two or more repeaters, some method must be employed to limit the number of times that a message is repeated. Limiting the number of times a message is repeated must be balanced with maximizing redundancy to achieve a suitably high probability that the message will ultimately make it to the master. However, limiting the number of times a message is repeated also limits the number of layers of repeaters that can be employed, thus limiting the range of the system.

An alternative to a broadcast network is a directed network where communication between repeaters is more efficient, in that the same message is not repeated unnecessarily, and also more effective at completing communications successfully. A directed network requires a known path from one repeater to the next as a message moves through the network. This known path allows the network to be more efficient and effective in delivering messages from a remote device to the master. Every message passed from one repeater to the next is not repeated by all other repeaters that may have received the message, as happens in a broadcast type system. Every received message is confirmed by an acknowledgment back to the sender so that arbitrary redundancy is not required. Much less communication traffic is generated in a directed network for any given message. Since every passed message is confirmed, a redundant attempt is required only if no acknowledgment occurred. If an attempted communication is not confirmed, an alternate path can be attempted. Thus, the capabilities of a directed network require much more intelligence in the system. For example, every repeater within the system must know where it is within the network, and in relation with other repeaters with which it can communicate in order to propagate a message toward the intended receiver.

In a directed network, layering of repeaters is necessary in order to propagate a message in the intended direction. Each repeater must be assigned an appropriate layer designation. In order to accommodate a relatively large scale system, it may be necessary to repeat an originated message several times, through several layers of repeaters, to get the message to the master. Thus, in such a system, a repeater receives a message, and propagates it to either another repeater which is closer to the master, or to the master itself. Thus, each repeater must be assigned to retransmit messages to another repeater. This assignment of repeaters to layers, and to communicate with specified other repeaters, can become complex.

Referring to FIG. 1, a diagram illustrating a free space wireless communication network 100 is now discussed. In the communication network 100, there is a master device 104, which communicates with a plurality of remote devices 108. As mentioned above, in order to expand the range of such a communication network 100, layers of relay devices may be used. In the free space example illustrated in FIG. 1, three layers of relay devices are illustrated, a first layer having first layer repeaters 112, a second layer having second layer repeaters 116, and a third layer having third layer repeaters 120. The communication network 100 can be used in a number of applications, such as, for example, utility metering where the remote devices 108 transmit usage information to the master device 104 for a particular utility meter. In such a system, the remote devices 108 are connected to a utility meter, such as a electricity or gas meter, and periodically transmit usage information for the utility meter to the master device 104. Information collected at the master device 104 may then be used for a variety of purposes, such as billing or demand forecasting. The communication network 100 may also be used in other applications, such as in a heating, ventilation, and air conditioning (HVAC) system, where the master device 104 may monitor temperature of other environmental conditions present at the remote devices 108, and adjust environmental conditions based on the information received from the remote devices 108. Furthermore, the communication system 100 may be used in applications where the remote devices 108 are mobile, such as a delivery service or a repair/maintenance service where a master device 100 may monitor the status of deliveries being made by a particular courier or the status of a particular repair/maintenance person through periodic check-ins by the courier or repair/maintenance person having a remote device 108 in their possession.

Referring now to FIG. 2, a practical network 101 is illustrated. As will be understood, the conceptual free space communications network 100 of FIG. 1 is generally not possible to implement. This is due to interference in the signals between a repeater and another repeater or a master or remote. Interference can be the result of, for example, localized radio interference, obstacles, topography or dense foliage in the transmission path. Accordingly, although a repeater may physically be closer to a master than another repeater, the closer repeater may not be able to wirelessly communicate with the master. Hence, the closer repeater will communicate with another repeater, which may be further away, in order to communicate with the master. As illustrated in FIG. 2, a master 104 communicates with a plurality of remote devices 108 through a number of layers of repeaters. As illustrated, a first level of repeaters 112 can communicate directly with the master 104. A second level of repeaters 116 communicates with the first level of repeaters 112, and a third level of repeaters 120. In the illustration of FIG. 2, the network has a fourth level of repeaters, 124, a fifth level of repeaters 128, a sixth level of repeaters 132, and a seventh level of repeaters 136. As can be noted from FIG. 2, a number of repeaters may be required to connect a remote 108 to the master 104 when obstacles are present. Furthermore, in such a practical network, it is common for new obstacles to enter the network, and for existing obstacles to disappear. Such situations may arise, for example, when buildings are erected in a communication path, buildings or trees are removed, or a source of radio interference is introduced or taken away. In such a changing network environment, it becomes increasingly difficult to maintain the directed network configuration, as repeaters have to change the repeater with which they communicate, and often require a change in their layer number. Accordingly, it would be advantageous to have a system in which repeaters may transmit status or maintenance messages for the purpose of keeping a current, and efficient, directed network.

SUMMARY OF THE INVENTION

In accordance with the present invention, a wireless communications network is provided which is able to transmit directed messages to and from devices within the network. In general, the present invention includes a master, a plurality of repeaters, and one or more remote devices. The master, communicates with the remote devices through one or more repeaters in order to transfer information to and from the remote devices. Thus, one aspect of the present invention is to provide a message protocol for communications between devices in the communication network. Further, a method for configuring a wireless communications network is described wherein devices within the network set a communications target based on signal strength of other devices within the network.

In accordance with an embodiment of the present invention, a method for wireless communication between a sending device and a receiving device is provided. The method includes forming a packet at the sending device, wirelessly communicating the packet from the sending device to the receiving device, receiving the packet at the receiving device, and performing a task at the receiving device based on information contained in the packet. The packet includes a plurality of message control bits and a plurality of information fields. At least a first message control bit indicates routing information for the packet, and at least a second message control bit indicates whether data is included in an information field which is associated with the second message control bit. The forming step may include identifying a message type for transmitting to the receiving device, setting the message control bits based on the message type, and formatting data for inclusion in at least one information field based on the message type.

One of the message control bits which may be set (to a binary 1 or alternatively re-set to a binary 0) is a survey bit, which is set when the sending device identifies that the message type is a survey message. In such a case, a survey field, including information related to signal strength, is formatted when the survey bit is set. One of the message control bits which may also be set (alternatively, re-set) is a message control bit, which is set when the message type is a transport message. In such a case, a layer/hop count field, including information related to a layer of the message and a number of times the message has been retransmitted, may be formatted when the layer bit is set. Another message control bit which may be set (or re-set) is an address bit, which is set when the message type is a directed message. In such a case, an address data field is formatted to contain unique identification information of an addressed device to which the message is to be delivered. Another message control bit which may be set (or re-set) is a trace bit, which is set when the message type is a routing trace message. In such a case, a trace data field is formatted to contain information related to the number of addresses contained in the trace data field and unique identification information for each addressed device through which the message has been sent for an inbound message or will be sent for an outbound message. Another message control bit which may be set (or re-set) is a direction bit, which is set when the message type is an outbound message. First and second remote type bits may also be set as message control bits. In such a case, the first and second remote type bits indicate a type of remote device associated with the message.

The receiving device may retransmit the packet to a second receiving device when the first control bit indicates that the packet is to be retransmitted. The receiving device may also format a response packet including information related to signal strength when one of the message control bits indicates that signal strength information is included in one of the information fields, and transmit the response packet to the sending device. The receiving device may also determine that signal strength information is included in the packet, read the signal strength information, compare the signal strength information with existing signal strength information, and reset a primary contact when the signal strength information indicates that the sending device has a stronger signal strength than an existing primary contact.

In another embodiment of the present invention, a wireless communications system is provided, which includes a master apparatus, at least one remote device, and at least one repeater. The master apparatus includes a memory which is operable to store program and data information, a processor in communication with the memory which is operable to form and receive messages including a first message, with the messages being transmitted and received by a transceiver in communication with the processor. Each of the messages includes a control field and a plurality of information fields, the control field having a plurality of control bits including at least a first control bit indicative of whether data is contained in an information field and at least a second control bit indicative of a direction of transmission for the first message. The remote device(s) include a remote memory operable to store program information and data information, a remote processor in communication with the remote memory which is operable to form and receive messages, the messages transmitted and received by a remote transceiver in communication with the remote processor and operable to transmit and receive the messages. The repeater(s) include a repeater memory operable to store program information and data, a repeater processor in communication with the repeater memory which is operable to form and receive messages, the messages transmitted and received by a repeater transceiver in communication with the repeater processor and operable to transmit and receive messages, wherein the repeater processor is operable to determine if a message is to be re-transmitted based on information contained in the control field.

The control field may include a survey bit that indicates, when in a predetermined state (e.g., a binary 1 or a binary 0), one of the information fields includes information related to signal strength. The control field may also include a layer bit that indicates, when in a predetermined state, one of the information fields includes information related to a layer of the first message and a number of times the first message has been retransmitted. In accordance with embodiments of the present invention, the layer field of a message is changed by each repeater that retransmits the message. The control field may also include an address bit that indicates, when in a predetermined state, one of the information fields includes identification information of a remote device to which the first message is to be delivered. The control field may also include a trace bit that indicates, when in a predetermined state, one of the information fields includes information related to a number of addresses and identification information related to where the first message has been sent or will be sent to. The control field may also include a control bit indicating whether said first message is to be retransmitted.

A first remote device can set a first repeater as its primary contact using signal strength. The first remote device determines that the first repeater is its primary contact based on information received from a plurality of repeaters including the first repeater.

In another embodiment of the present invention, a method for configuring a wireless communications network is provided. In this embodiment, the wireless communications network includes a plurality of remote devices including a first remote device, a plurality of repeaters and a master apparatus. The first remote device determines that the first repeater is a communications target using a message related to signal strength. The determination that the first repeater is a communications target may include transmitting said message related to signal strength from the first remote device and receiving at the first remote device response messages indicative of signal strength from at least some of the plurality of repeaters. The determination may include ascertaining by the first remote device information related to desired signal strength. The desired signal strength relates to a greatest signal strength based on a number of response messages from at least the first repeater. The first remote device may then set the first repeater as the primary contact. The first remote device may repeat, at predetermined time intervals, the determination of a communications target using a message related to signal strength.

Based on the foregoing summary, a number of salient features of the present invention are readily discerned. A wireless communications network which provides directed transmissions between components of the network is provided. The components within the wireless communications make a determination of a communications target, which may be used as a primary contact, automatically, and may repeat the determination at predetermined intervals. Thus, the wireless communications network is able to adapt over time to additional components added into the network, or changing environmental conditions in and around the network.

Additional advantages of the present invention will become readily apparent from the following discussion, particularly when taken together with the accompanying drawings.

DETAILED DESCRIPTION

Figure 1:
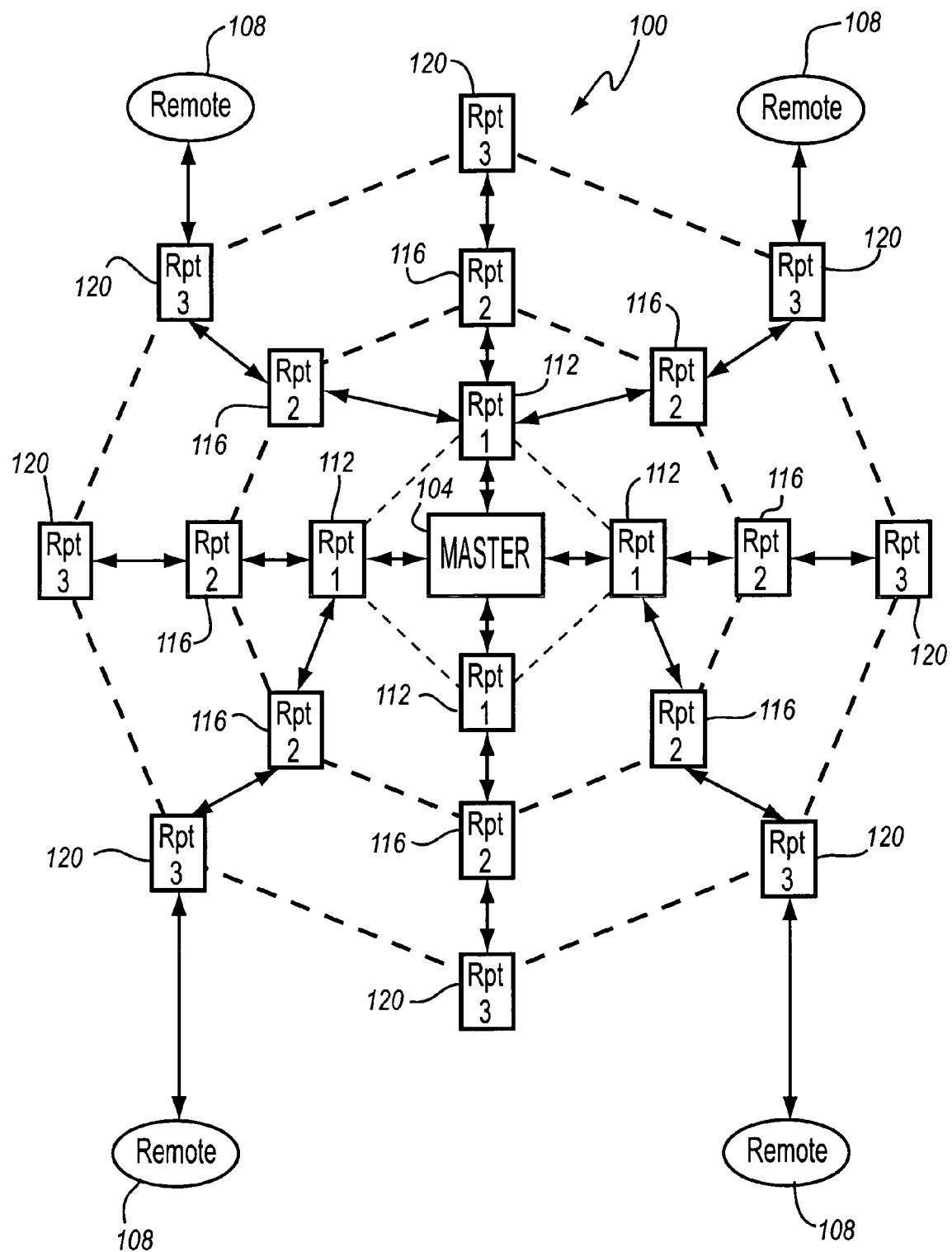
FIG. 1 is a diagram illustrating a conceptual free space wireless communication network having repeaters.
Figure 2:
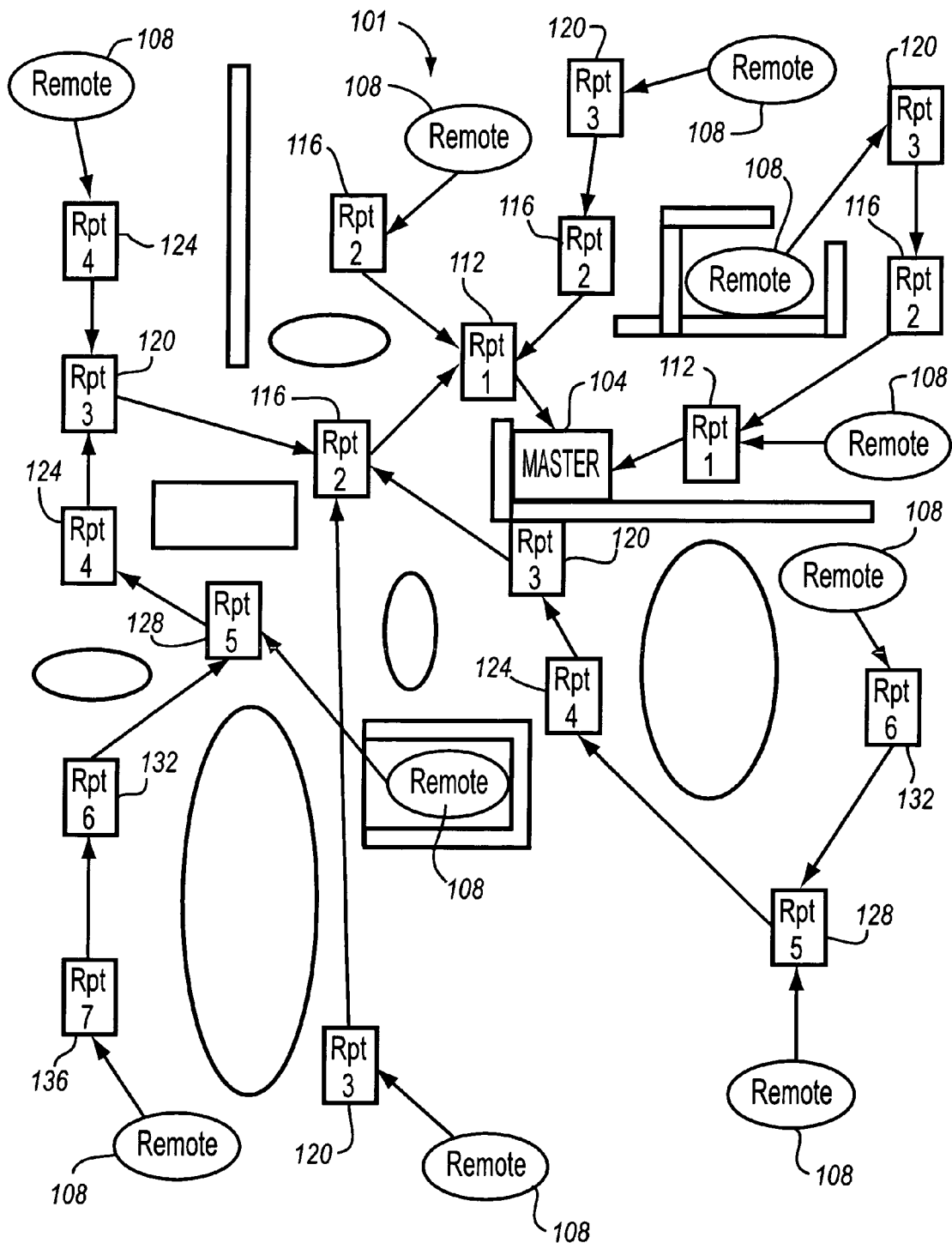
FIG. 2 is a diagram illustrating a practical wireless communication network having repeaters.
Figure 3:
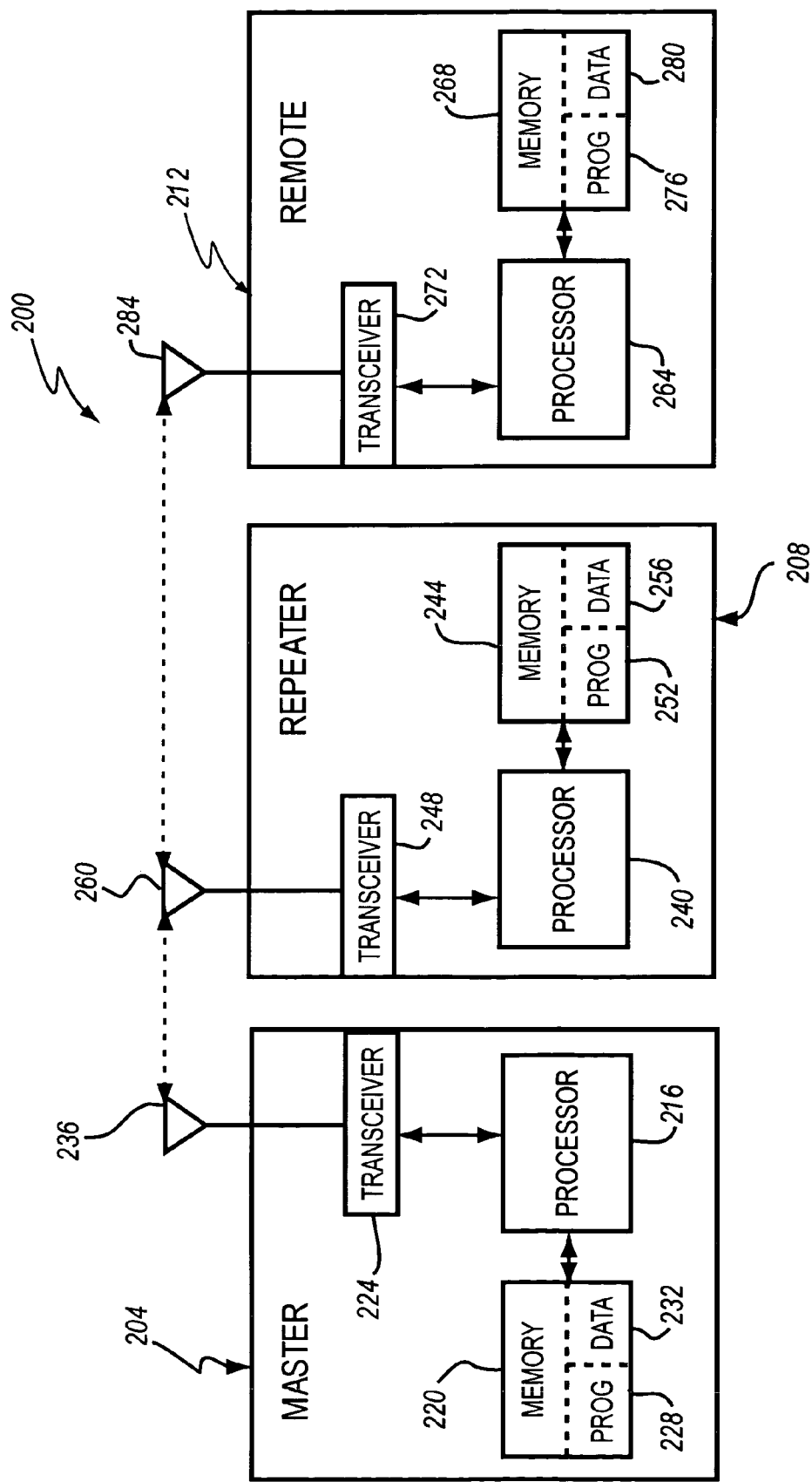
FIG. 3 is a block diagram illustration of a master, repeater, and remote device of one embodiment of the present invention.

Referring now to FIG. 3, a block diagram illustration of a portion of a wireless communication network 200 of the present invention is described. In its simplest form, the wireless communication network 200 includes a master 204, a repeater 208, and a remote device 212. It will be understood that the wireless communication network 200 may contain a number of repeaters 208 and remote devices 212. Furthermore, multiple repeaters 208 may be required for the master 204 to communicate with a remote device 212, in a similar fashion as described above with respect to FIGS. 1 and 2. In such a case, the repeaters 208 are assigned layer numbers, and transmit messages to repeaters 208 having a lower layer number, for inbound messages to the master 204, or to repeaters 208 having a higher layer number, for outbound messages away from the master 204.

The master 204 includes a processor 216, a memory 220, and a transceiver 224. The processor 216 controls communication to and from the master 204. The memory 220 has a program region 228 for storing program information, and a data region 232 for storing data. The program region 228 may be a non-volatile memory, such as a magnetic media, flash memory, or other memory type. The data region 232 may be volatile memory, such as DRAM or SRAM, and may be periodically backed up to non-volatile memory. The processor 216 operates based on program information in the program region 228, and retrieves and stores data in the data region 232. The processor 216 communicates with the transceiver 224, which is attached to an antenna 236. The transceiver 224 transmits and receives wireless transmissions through the antenna 236.

The repeater 208 has a processor 240, a memory 244, and a transceiver 248. The processor 240 controls communication to and from the repeater 208. The memory 244 has a program region 252 for storing program information, and a data region 256 for storing data. The program region 252 may be a non-volatile memory, such as a magnetic media, flash memory, or other memory type. The data region 256 may be volatile memory, such as DRAM or SRAM, and may be periodically backed up to non-volatile memory. The processor 240 operates based on program information in the program region 252, and retrieves and stores data in the data region 256. The processor 240 communicates with the transceiver 248, which is attached to an antenna 260. The transceiver 248 transmits and receives wireless transmissions through the antenna 260.

The remote device 212 has a processor 264, a memory 268, and a transceiver 272. The processor 264 controls communication to and from the remote device 212. The memory 268 has a program region 276 for storing program information, and a data region 280 for storing data. The program region 276 may be a non-volatile memory, such as a magnetic media, flash memory, or other memory type. The data region 280 may be volatile memory, such as DRAM or SRAM, and may be periodically backed up to non-volatile memory. The processor 264 operates based on program information in the program region 276, and retrieves and stores data in the data region 280. The processor 264 communicates with the transceiver 272, which is attached to an antenna 284. The transceiver 272 transmits and receives wireless transmissions through the antenna 284.

The remote device 212 may be one of a number of different types of remote devices, such as a battery powered remote device or a line powered remote device. Furthermore, a remote device 212 may be capable of two-way transmission, both sending and receiving communications through the transceiver 272 and antenna 284, or may simply be a one-way remote device, periodically sending transmissions. The device may also be a scanning device where the remote device 212 scans through all of the communications channels periodically checking for communications, or a non-scanning device where the remote device 212 simply looks for a transmission on a predetermined channel associated with a predetermined frequency (or frequency range) at a predetermined time. If a remote 212 is a non-scanning device, it is necessary to synchronize the remote with the repeater 208 that it communicates with. Synchronization can also enhance the battery lifetime of a battery powered remote device 212, as the device is only required to power up and transmit and/or receive at predetermined time intervals.

Figure 4:
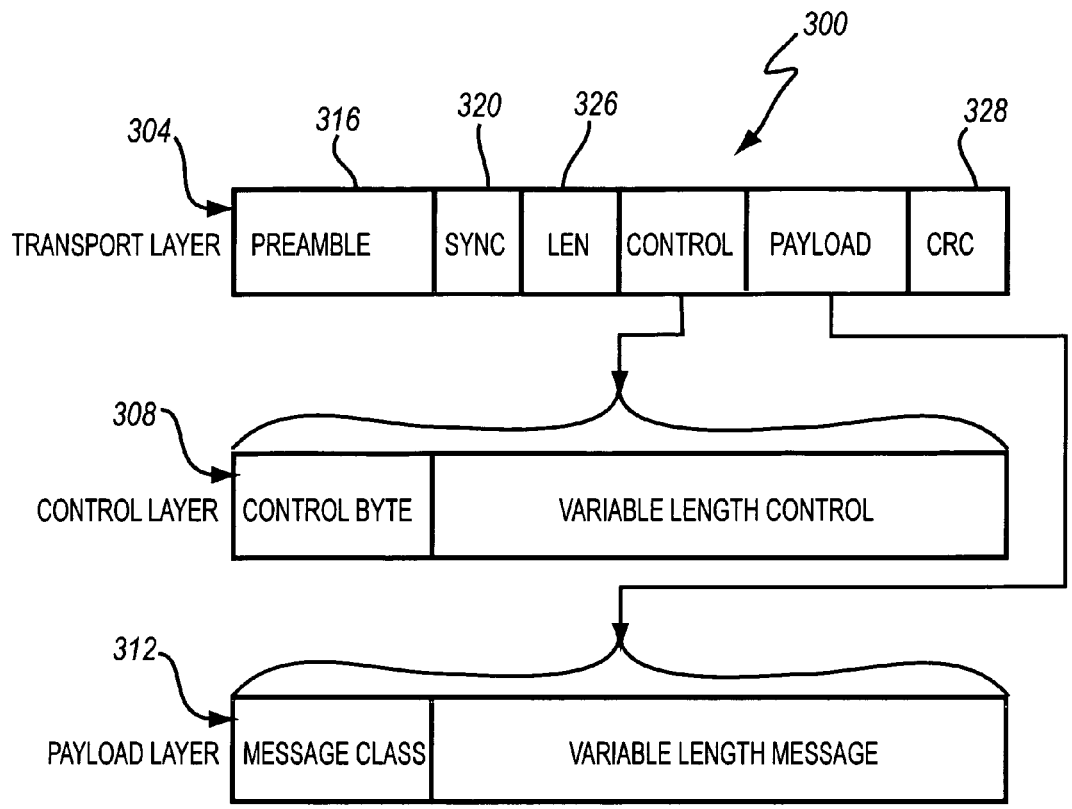
FIG. 4 is a block diagram illustration of a message transport protocol of one embodiment of the present invention.
Figure 5:
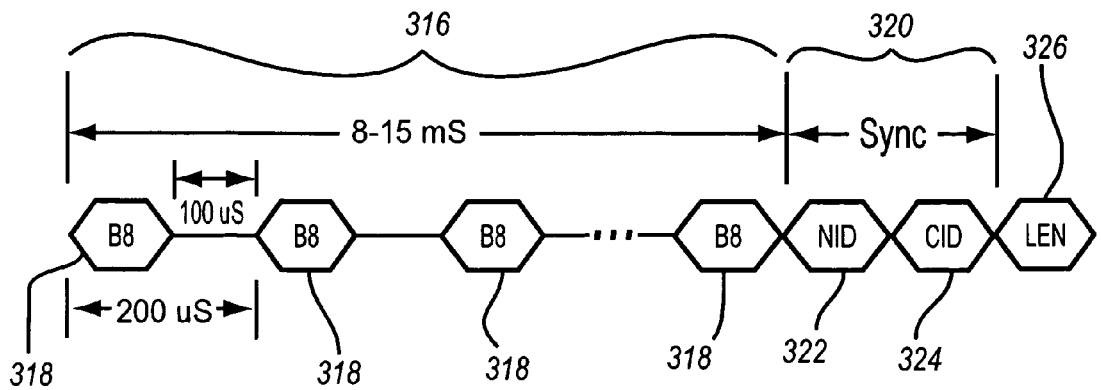
FIG. 5 is a timing diagram illustration of a portion of a transmission packet of one embodiment of the present invention.

Communications between the components in the wireless communications network are conducted using a predefined communications protocol. This communications protocol allows different devices, i.e. the master, a repeater, and a remote device, to communicate with each other, and to direct transmission of information to a specified location. FIG. 4 illustrates a block diagram representation of the message transport protocol of one embodiment of the present invention. The message transport protocol uses transmission packets 300 to communicate information between different devices. The transmission packets 300 contain multiple layers of information. A first layer is the transport layer 304. The transport layer 304 contains all of the information needed to pass information between devices. The transport layer 304 contains a control layer 308, which has control information used for multiple purposes and which will be described in further detail below. The transport layer 304 also contains a payload layer 312, which has payload information and which will be described in further detail below.

The transmission packet 300 is simply a tool to transport message data and determine if that data is error free. The content of the message is processed by the processor within each device. The transport layer 304 initially contains a preamble 316. The purpose of the preamble 316 is to transmit a signature signal to the receiving device that indicates that a message is pending on that particular channel. In accordance with embodiments of the present invention, the preamble 316 varies in length. Factors that may be considered in selecting the duration or length of the preamble include message prioritization requirements and battery life, which in turn are affected by the application in connection with which the communication network 200 is used. As examples of different preamble durations that may be selected for different applications, a preamble duration of 16 milliseconds may be used for security system applications, while a preamble duration of 12 milliseconds may be selected for submetering applications. In one embodiment, the preamble 316 is selected so that it corresponds to a scan time of the transceivers in receiving devices. The scan time of the transceivers in the receiving devices is the length of time necessary to scan all of the channels in its channel list. For example, a receiver may scan through 64 channels when looking for an incoming signal. In one embodiment, all of the receivers used in a communication network take a maximum of 5 ms to scan through the 64 channels. Accordingly, by having at least a 5 ms preamble 316 in this embodiment, the receiver will encounter the preamble 136 at least once in its scan cycle. It will be understood that the length of the preamble 316 may vary depending upon the maximum scan time of the receiving devices, such that the receiver will encounter the preamble 316 at least once in its scan cycle. In accordance with other embodiments, the preamble length may depend on the frequency band used for transmission. For example, where the 868 MHZ frequency band is used, a nominal 8 mS preamble duration may be used.

In one embodiment, the transmission packet 300 is transmitted using a 50 KBPS transmission rate using the 902-928 MHZ ISM band in the United States under part 15.247 of the Federal Communications Commission (FCC) rules. In this embodiment, the 902-928 MHZ ISM band is split into 64 channels with 400 kHz channel spacing, with data imposed on the carrier with Frequency Modulation (FM) using a peak deviation of 80 kHz. In accordance with further embodiments, no more than 25 of the channels are used at any time. Furthermore, embodiments may transmit by imposing data on the carrier with frequency modulation such that a data rate of 25 kBPS is provided. In another embodiment, the transmission packet 300 is transmitted using a 25 kBPS transmission rate using the 868 MHZ band in Europe which is governed by CEPT. In this embodiment, the 868 MHZ band is split into 2 or 4 channels with varying channel spacing to avoid restricted portions of the 868 MHZ band, with data imposed on the carrier with FM using a peak deviation of 50 kHz. Digital data is transmitted, in one embodiment, using an asynchronous alternate mark inversion (AMI) line-encoding format on the FM link. In another embodiment, Manchester encoding is used to transmit digital data on the FM link.

In one embodiment, devices within the network employ a listen before talk feature. The listen before talk requires that in any directed messages, the transmitting device checks the transmit channel to be clear of other message carriers before it transmits its message. If the channel is occupied, the transmitter moves to the next channel in sequence and listens again. It continues in this process until a clear channel is found. This process does not apply to broadcast type messages.

The preamble bits in accordance with embodiments of the present invention include an initial six binary ones followed by a binary zero. The total of seven bits in the preamble is used because it has a low correlation with noise. However, preambles other than those with such seven bits may be used. For example, in the 860 MHZ frequency band, the preamble may comprise a series of 1 bits followed by a single 0 bit to allow the receiver to synchronize to the falling edge of the 1's and still recognize the pattern of 1's followed by a 0, and two successive 0's indicate the end of the preamble.

In accordance with embodiments of the present invention, the preamble sequence comprises a series of 1 bits followed by a single 0 bit, that is followed by 5 bits representing the channel on which the message is transmitted, followed by a single 0 bit. This pattern may be repeated for the entire preamble duration. Two 0 bits are transmitted after the last channel sequence and before the network ID byte is transmitted, to indicate the end of the preamble and the start of the message. The channel information transmitted may be in the form of an index representing the location within a pseudo random ordered list of channels used by the transmitter. Therefore, the receiving device must possess the same pseudo random ordered list as the transmitter in order to find the correct channel on which the message is transmitted. For instance, a transmitter may have channel 31 (914.8 MHz) in its list at location 1, and channel 26 (912.8 MHz) in its list at location 2. If the transmitter is at location 2 (00010) in its sequence, the binary value of 2 is transmitted in the preamble. The receiver will then search its table to determine that the value of 2 indicates that the message is transmitted on channel 26. If the receiver is not on this channel at the time of preamble decoding, it will switch to the correct channel and continue with decoding. By transmitting the channel information, off channel decoding, in which spurious emissions from the local oscillator of the receiver and from the transmitter cause a receiver to try to decode a message off channel if the physical distance between the transmitter and receiver is sufficiently short, is prevented. In particular, based on the content of the preamble 316, the receiver can immediately switch to the correct channel.

Following the preamble 316 in the transport layer 304 is a synchronization (SYNC) frame 320. The SYNC frame 320, in one embodiment, contains two bytes. The first byte of the SYNC frame 320 is a network identification (NID) byte 322. The NID byte 322 is used as a filter mechanism to differentiate communication networks which may have overlapping coverage areas. In accordance with embodiments of the present invention, the NID has three bits that indicate the frequency band used by the network and 5 bits for uniqueness within the band. A NID is assigned to each master 204 at the manufacturing facility, and in one embodiment the NID is determined by hashing a unique serial number of the master 204. For example, the lower five bits of the NID will equal the lower five bits of the low serial number byte assigned to the network controller or master 204. If the lower five bits of the serial number is equal to zero, the lower five bits of the NID may be assigned a value of 1. The value of 0 for the lower five bits of the NID may be reserved as the default value for the NID. Repeaters 208 must relay messages that are the default value. Accordingly, an off the shelf one-way transmitter, such as a one way remote 212, may use the default value so that it does not require field programming to operate. A repeater 208 that has not been configured may also use the default value until it is assigned another value. The band used by an echo device may be selected by a jumper, which will select both the frequencies used and the value of the upper three bits of the NID 322. In the event that two adjacent networks have the same NID, the NID of one master can be changed in the field. The discovery of two overlapping networks having the same NID might be made by an operator or installer during installation of one of these two networks. After such installation, such a discovery might be made based on a determination that one or more devices in the overlapping network is not enrolled or recorded as being an authorized device in the particular network. Regardless of the manner of discovery, the operator can initiate the providing of a new NID using the master 200. In one embodiment, two consecutive zeros following the NID byte 322 signal the end of the preamble 316.

In accordance with embodiments of the present invention, the upper three bits for the 868 MHz band are all zeros. For the 900 MHz frequency band, the bits are defined as follows:

| b7 | b6 | b5 | BAND |
|----|----|----|------|
| 0 | 0 | 0 | 902.4-927.6 MHz |
| 0 | 0 | 1 | 915.6-927.6 MHz |
| 0 | 1 | 0 | 921.6-927.6 MHz |
| 1 | 0 | 0 | Undefined |
| 1 | 0 | 1 | Undefined |
| 1 | 1 | 0 | Undefined |
| 1 | 1 | 1 | Undefined |

Following the NID byte 322 in the SYNC frame 320 is a customer identification (CID) byte 324. The CID byte 324 is used to filter out messages that are not associated with a specific customer. The CID byte 324 may be used to ensure that a specific customer has an exclusive set of unique identification values. The CID byte 324 is assigned to customers on a case-by-case basis. In one embodiment, the CID byte 324 based filtering is disabled in the communications network, and can only be enabled if a CID byte 324 is manually programmed into the network.

Following the SYNC frame 320 in the transport layer 304 is a length (LEN) field 326. The LEN field 326 is composed of a single byte which follows the SYNC frame 320. The LEN field 326 indicates the number of bytes to follow in the message. The LEN field 326 includes, in one embodiment, the number of bytes contained in a CRC field. The LEN field 326, in this embodiment, is one byte, giving a maximum number of bytes following the LEN field 326 of 255 bytes.

Following the LEN field 326 in the transmission packet 300 is the control layer 308, which will be described in more detail below. Following the control layer 308 is the payload layer 312, which will also be discussed in more detail below. The final portion of the transmission packet 300 is a CRC field 328. As will be understood, the CRC field is used to check for errors in the transmitted message. In one embodiment, the CRC field is two (2) bytes long and is based on the well-known CCITT polynomial. The CRC is computed over the entire transmission packet 300 beginning with the SYNC frame 320.

Figure 6:
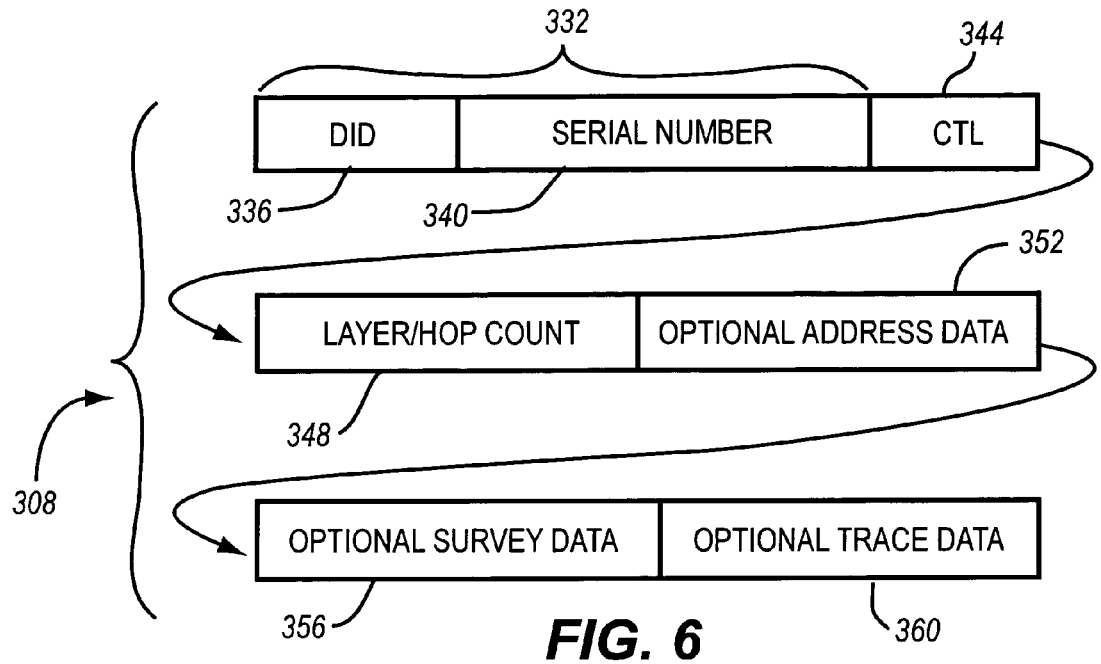
FIG. 6 is a block diagram illustration of a control layer of one embodiment of the present invention.
Figure 7:
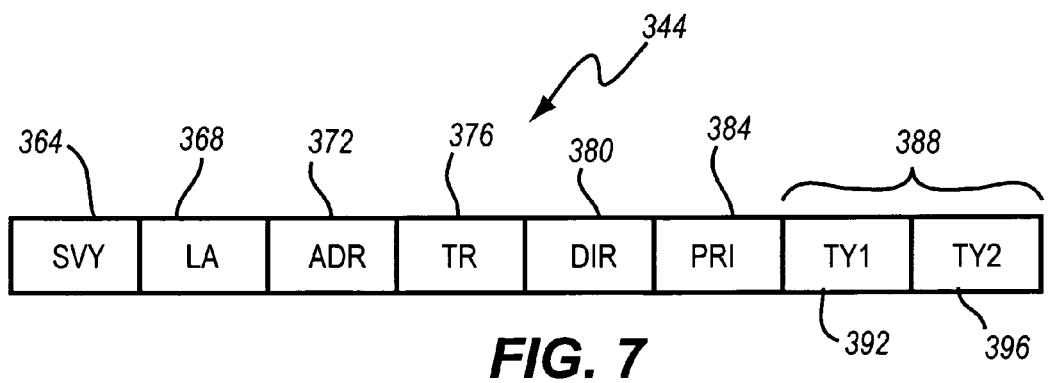
FIG. 7 is a block diagram illustrating the contents of a control byte of one embodiment of the present invention.

Referring now to FIGS. 6 and 7, the control layer 308 will now be described in more detail. The control layer 308 contains a number of fields which are used to route a message through the network. The first field in the control layer 308 is a unique identifier (UID) field and contain a unique identification for the device which originated the message. The UID field 332, in one embodiment is four bytes and contains a device identification (DID) portion 336 and a serial number (SN) portion 340. The DID portion 336 is a one-byte identifier that is unique for a particular type of device. For example, a master 204, in one embodiment, has a DID portion 336 of zero (0), and repeaters 208 have a DID portion 336 of one (1). The remaining devices are assigned DID portions 336 on a case-by-case basis for a particular market or application. The SN portion 340 follows the DID portion 336, and is a three-byte identifier which corresponds to a serial number for the device. The DID portion 336, and the SN portion 340 together form a unique identification for each device in the network. This information can be used in a number of ways which allow the devices in the network to identify the sending device and associate the sending device with additional information contained in the transmission packet 300, as will be described in more detail below.

Following the UID field 332 in the control layer 308 is a control (CTL) byte 344. Each bit within the CTL byte 344 may be independently set and cleared to describe how the transmission packet 300 is to be handled within the network and also indicate if additional control information follows within the control layer 308. Following the CTL byte 344 is a layer/hop count field 348 which indicates the layer of the message, and the number of times the message is retransmitted as it passes through the network, as will be described in more detail below. Following the layer/hop count field 348 are three optional fields, an optional address data field 352, an optional survey data field 356, and an optional trace data field 360, each of which will be discussed in more detail below.

Referring to FIG. 7, the individual bits within the CTL byte 344 are now described. In the embodiment of FIG. 7, the first bit within the CTL byte 344 is a survey (SVY) bit 364. The SVY bit 364 indicates that signal strength data is included in the optional survey data field 356. The signal strength data in the optional survey data field 356 includes, in one embodiment, a received signal strength indicator (RSSI) value, a noise floor value, and a serial number of the repeater receiving the message from the origination device. The total length of the optional survey field 356, in one embodiment, is 5 bytes, and composed of a one-byte RSSI measurement of the repeater, a one-byte noise floor measurement of the channel of the transmission as measured by the repeater, and the repeater's three-byte serial number. This information is passed through the network unmodified and may be used for surveying, locating, and trouble shooting purposes. Survey data is found only on messages that are inbound to a repeater or master and is added by each repeater that receives the message directly from the origination device. Thus, when a repeater receives a message from a remote device, it determines the RSSI and noise floor measurements formats the information into the survey data field 356 and sets the SVY bit 364 in the control byte 344 for the retransmitted message.

In one embodiment, the master uses this survey information to assemble a RSSI matrix. The RSSI matrix is a table maintained by the master that is used for directing outbound messages to specific devices and for network surveying and troubleshooting. The RSSI matrix is formed from periodic supervisory, or status, messages of repeaters and is composed of the RSSI levels measured by the repeaters and master from other repeaters the next layer up in the network. A repeater will transmit a status message as a layered inbound message which will be described in more detail below. Each repeater in the next lower layer which receives this message will append its UID and RSSI level and transmit this message as directed inbound message to the master. The master will retain the UID of all of the repeaters that heard the original message and the RSSI measured from each of those repeaters. Each message received from a remote will be stored in the master with the address of the repeater that heard the original message, the first hop repeater. To send a directed outbound message to a two-way remote, the master will include the UID of the remote and the UID of the first hop repeater. The master will determine from the RSSI matrix what path within the network to take to deliver this message to the repeater (and remote) and attach each repeater's UID to the directed message. The last repeater (first hop repeater) to receive this message will transmit the message directly to the remote.

Using the RSSI matrix, the master will construct a path through the repeater network that the message will travel. The UID of the first hop repeater is always the last address in the path. The RSSI matrix will first be searched for entries in which the source of the status message is the first hop repeater. Of those entries, the UID of the receiving device with the highest measured RSSI is selected. This is the UID of the second hop device and is placed next to last in the path. The RSSI matrix will be searched again for entries in which the source of the status message is the second hop repeater. Of those entries, the UID of the receiving device with the highest measured RSSI is again selected. This UID is placed before the second hop device in the path. The process is continued until the UID in the column is that of the master, which is always the first device in the path of a directed outbound message.

Following the SVY bit 364 in the control byte 344 is a layer (LA) bit 368. If the LA bit 368 is set, this indicates to the device receiving the message that layer bits in the layer/hop count field 348 are relevant to the repeaters transporting the message. A repeater will only retransmit an outbound message from a layer lower than its own layer, and only retransmit an inbound message from a layer greater than its own. In one embodiment, a repeater is operable to automatically determine its layer, as will be discussed in more detail below. Upon retransmission of an outbound message, a repeater changes the layer number in the message to the layer of that transmitting repeater. An inbound message with the layer bit 368 set is converted to a directed message by a repeater, having a destination device address. In one embodiment, the layer/hop count field 348 is a one-byte field with the upper three bits representing the number of the layer of the device originating the message. A layer of zero (0) represents the layer of the master. The lower five bits of the layer/hop count field 348 indicate how many times the message has been retransmitted as it is passing through the network.

Following the LA bit 368 in the control byte 344 is an addressed (ADR) bit 372. The ADR bit 372 is set if the message is being addressed to a particular receiver. In such a case, the control layer 308 includes the optional address data field 352 which contains the UID of the device to which the message is directed. It should be noted that, in this embodiment, the ADR bit 372 and the LA bit 368 are mutually exclusive indicators. A message may not simultaneously be addressed and layered, because an addressed message indicates a specific device which is to receive the message, whereas a layered message merely indicates that a repeater is to retransmit the message either inbound or outbound. In one embodiment, an acknowledgment of an addressed message is required.

Following the ADR bit 372 in the control byte 344 is a trace (TR) bit 376. The TR bit 376 is set if a routing trace is associated with the transmission packet. A routing trace indicates that trace information is included in the optional trace data field 360. When the TR bit 376 is set, trace information is added to the optional trace data field 360 for inbound messages, or subtracted from the optional trace data field 360 of outbound messages as the transmission packet 300 moves through the network. Trace information may be used for network troubleshooting or for implementing addressed outbound messages. If an originating remote device requires an inbound message to be traced, it sets the TR bit 376 and sets information in the optional trace data field 360 to zero (0x00). The optional trace data field 360, in one embodiment, consists of a one-byte count indicating the number of addresses contained in the field, followed by that number of UID's which represent the UID of each hop of the trace, with each UID being 4-bytes in length. If a message is inbound from a remote device to the master, and the message is to be traced, the UID of each successive repeater is post-pended to the trace data field 360, and the trace count is incremented. If a message which is to be traced is an outbound message from the master to a remote device or repeater, the trace data field 360 is set to include the number of hops and the UID of each device through which the message is to be transferred. At each repeater where the message is retransmitted, the UID of that repeater is removed from the trace data field 360 and the trace count within the trace data field 360 is decremented.

Following the trace bit 376 in the control byte 344 is a direction (DIR) bit 380. The DIR bit 380 determines the direction that the message is flowing through the network. If the bit is set, it indicates that the message is directed inbound toward the master. If the bit is clear, it indicates that the message is directed outbound away from the master. Following the DIR bit is a priority (PRI) bit 384. The priority bit is set by the originating device of a message that must be transmitted with high priority. This information may be utilized by the repeaters for increasing the number of rounds transmitted and to select a more favorable hop sequence. In accordance with embodiments of the present invention, the priority bit is only set by an alarm transmitter when transmitting a non-supervisory alarm or fault transmission.

Following the PRI bit 384 in the control byte 344 is a remote type indicator 388 which uses two bits, TY1 392, and TY2 396. The two bits of the remote type indicator 388 are used to indicate the type of device that originated an inbound message or the type of device that is the destination of an outbound message. In one embodiment, four types of remote devices are present, those being a full two-way device, a one-way remote, a battery powered non-scanning two-way remote, and a line-powered two-way non-scanning remote. Each of these remote devices is assigned a unique value for the remote type, which can be represented in the remote type indicator 388. It will be understood that certain applications may have fewer types of remote devices present in the network, or may have more types of remote devices in the network.

Figure 8:
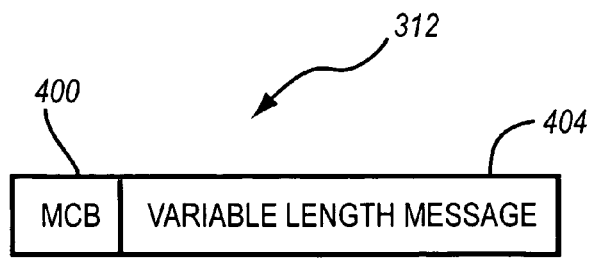
FIG. 8 is a block diagram illustration of a payload layer of one embodiment of the present invention.
Figure 9:
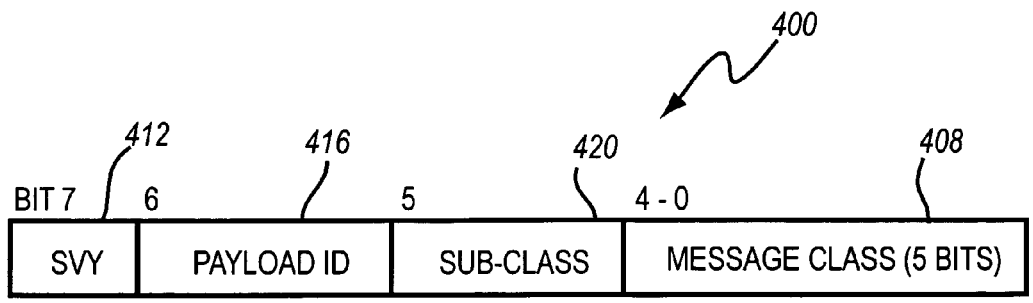
FIG. 9 is a block diagram illustration of a message class byte of one embodiment of the present invention.

Referring now to FIGS. 8 and 9, the payload layer 312 will now be described. The format and content of the payload layer 312 of the transmission packet 300 is dependent upon the type of message, or message class, being transmitted. The payload layer 312 contains a message class byte (MCB) 400, and a variable length message field 404. The length and content of the message field 404 depends upon the message class. FIG. 9 illustrates the content, for one embodiment, of the message class byte 400. The MCB 400 provides an indication of the content of the message field 404, thus defining the intended use of the message. The message class byte 400 is divided into a plurality of bit fields, with the lower five (5) bits define a message class field 408. The five bits of the message class field 408 may thus define thirty-two (32) unique, specific message classes. In one embodiment, two message classes are reserved for network maintenance messages, with the remaining message classes available for application specific messages.

The message class byte 400 also includes a survey bit 412. When set, the survey bit 412 provides an indication to the first repeater that receives the message to add survey data to the repeated message transmitted from the repeater. The message class byte 400 also includes a payload ID bit 416. When the payload ID bit 416 is set, it provides an indication that the transmitter application identification is included in the message field 404. As mentioned above, a transmitter application identification provides an indication of a particular application identification for a remote device. Thus, the master may transmit a message to a remote device having the payload identification bit 416 set, and the remote device will set its application identification to what is contained in the message field 404. This provides the ability to re-assign an application identification to a transmitter in the field, thus allowing independent control of transmitter identification and compatibility with other systems. For example, a gas metering remote device from a first network may have a different application identification than a gas metering device in a second network. Rather than requiring a specific application identification for such devices, the application identification may be programmed in the field, allowing for more flexibility in the network. The message class byte 400 also includes a sub-class bit 420. The sub-class bit 420 may be used to indicate that the byte following the message class byte 400 is a sub-class byte. This provides the ability to have additional message class bytes should an application require any such additional bytes. Alternatively, the sub-class byte may be used as a product type identifier to differentiate products within the same market, such as for distinguishing a passive infrared detector (PIR) from a pendant transmitter.

As mentioned above, in one embodiment, the bits in the message class field 408 may define thirty-two (32) unique, specific message classes, with two message classes are reserved for network maintenance messages. In this embodiment, network maintenance messages are defined by zero (0) and one (1), with the remaining classes (2-31) defining application specific message classes. When a network maintenance message is specified, the bit positions held by the survey bit 412, payload identification bit 416, and the sub-class bit 420 are substituted with a number indicating the specific network maintenance message. Thus, up to sixteen (16) network maintenance messages are possible when the network maintenance message classes are selected.

Figure 10:
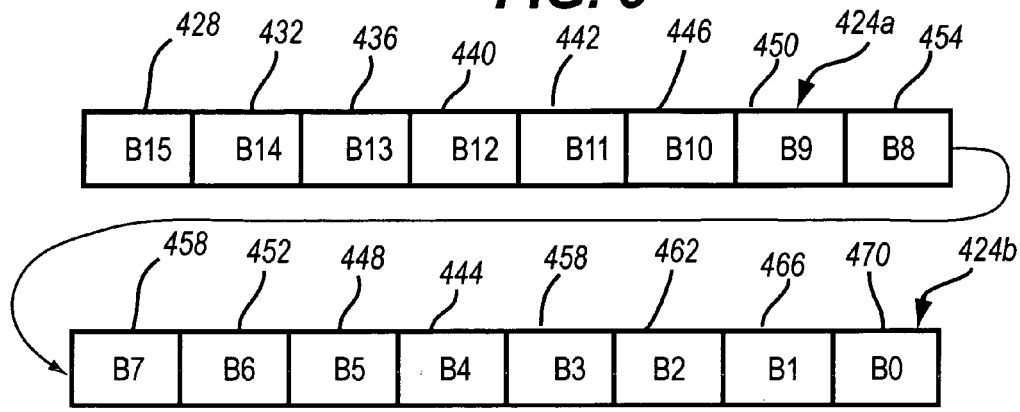
FIG. 10 is a block diagram illustration of a repeater status byte of one embodiment of the present invention.

One network maintenance message is a repeater status message. Such a message is transmitted by a repeater to the master, indicating the current status of the repeater. A repeater status message, in one embodiment, includes a two byte message field 404 which contains two repeater status bytes 424*a* and 424*b*, which are illustrated in FIG. 10.

The first repeater status byte 424*a* contains eight status bits, B8-B15. In one embodiment, a first status bit, B15 428 indicates the status of a repeater's layer assignment and neighbor list. When set, B15 428 indicates that the repeater does have a neighbor list and a layer assigned. As will be described in more detail below, a repeater forms a list of repeaters with which it can communicate as a neighbor list, and also has a layer assignment which indicates the relative location of the repeater within the network. A second status bit, B14 432, when set indicates that the repeater does not have any primary neighbors. A primary neighbor, as will be described in more detail below, is a repeater which has the strongest signal strength when communicating with the repeater reporting the status message. A third status bit, B13 436, when set indicates that the status message is sent as an acknowledgment of a configuration message. Such a status message is transmitted from the repeater in response to receiving a configuration message from the master. A fourth status bit, B12 440, when set indicates that the repeater has at least one non-scanning remote synchronized to it. Such non-scanning remote devices do not scan for incoming signals, but rather look for incoming signals at predetermined intervals. The fifth status B11 442, the sixth status bit B10 446, the seventh status bit B9 450, and the eighth status bit B8 454 may be unused or may be reserved for other status messages.

The second status byte 424b contains an additional eight status bits, B0-B7. In accordance with embodiments of the present invention, the ninth bit of the two repeater status bytes 424, B7 458, when set indicates that the repeater is jammed. The tenth bit, B6 452, when set indicates that the repeater has a low battery. The eleventh status bit B5 448, when set indicates that the repeater case has been tampered with. The twelfth status bit B4 444, when set indicates that the status transmitted by the repeater is supervisory, and that no change has occurred in the repeater configuration since the last status message for the repeater. The thirteenth status bit, B3 458, when set indicates that the status message was transmitted immediately following a reset. The fourteenth status bit, B2 462, when set indicates that the battery is missing. The fifteenth status bit, B1 466, when set indicates that line power has been lost, and that the repeater is operating on battery power. The sixteenth status bit, B0 470, when set indicates that the battery is defective.

Another network maintenance message is a repeater configuration message. Such a message may be used to enable or disable specific repeater functions, set timing parameters, signal thresholds, list of IDs to screen, and to force a repeater to initiate an action such as layer reassignment. The payload of the repeater configuration message is formatted with a repeater configuration message class byte, a repeater configure sub-header, and optional data. The repeater configuration message may be transmitted from the master as a broadcast message which is outbound, using a universal serial number so that all of the repeaters in a network can be configured quickly or as a directed message so that individual repeaters may be configured separately. When a message is intended for a specific type of device, such as a repeater the master can use the universal serial number, or universal ID, which in one embodiment is all binary zeros. The master, when using the universal ID, sets the device ID to be the type of device the message is intended for, such as plurality of repeaters or all repeaters in the network. For those repeater configuration messages requiring a response from the repeater, the repeater utilizes a repeater configuration response message class byte, otherwise, a repeater status message is sent as an application acknowledgment with the appropriate bit set in the repeater status byte.

Figure 11:
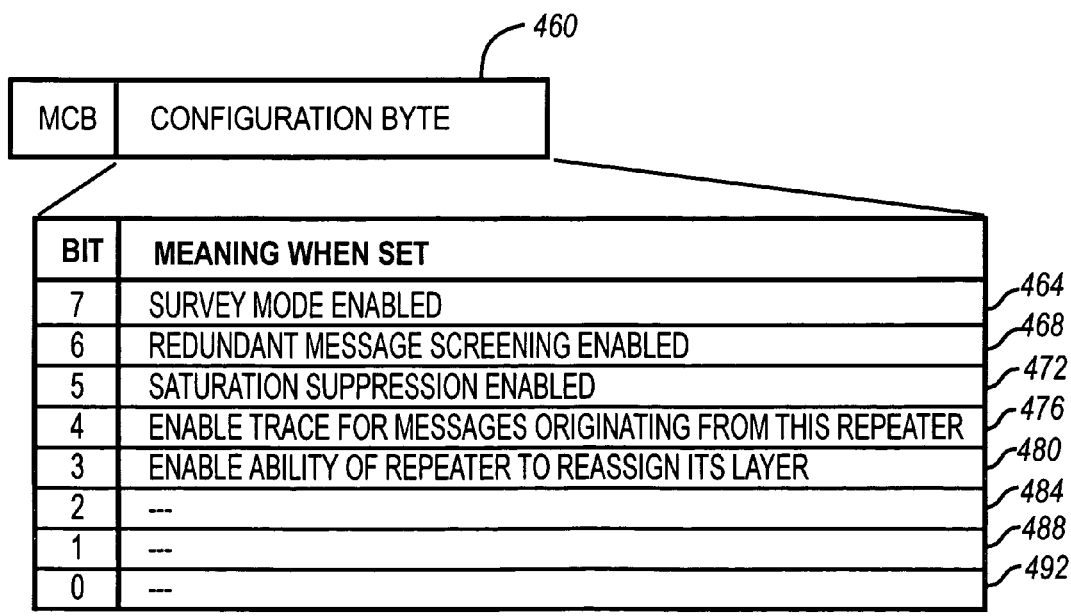
FIG. 11 is a block diagram illustration of a payload layer with a configuration byte of one embodiment of the present invention.

Referring now to FIG. 11, repeater options within a repeater configure sub-header byte 460 are now described. The repeater configure sub-header byte 460 may have a survey mode bit 464 which indicates, when set, that a survey mode is to be enabled for the repeater. A redundant message screening bit 468, when set, indicates that the repeater is to screen messages received at the repeater and not retransmit messages which are redundant. A saturation suppression bit 472, when set, indicates that the repeater is to enable saturation suppression. A trace enable bit 476, when set, indicates that the repeater is to enable tracing for messages originating from the repeater. A layer reassignment bit 480, when set, indicates that the repeater is to enable layer reassignment ability, and allow the repeater to reassign its layer number as conditions within the network change. The repeater configure sub-header byte 460 also contains three bits 484, 488, 492 which are not set to a predefined indication, thus allowing for application specific or user programmable configurations.

The message field 404 in the repeater configuration message may also contain timing parameters for the repeater. The timing parameters can include repeater check-in time periods, which define the timing of periodic repeater status message transmissions to the master. The timing parameters can also include time between synchronization windows, for use when synchronizing with remote devices. The timing parameters can include a time to remain in synchronization mode following a synchronization request, a time for a saturation suppression entry to be retained, and a time for a redundant message screening entry to be retained.

Furthermore, the message field 404 in the repeater configuration message may also contain signal thresholds to be used by the repeater. The signal thresholds, in one embodiment, are given in values of dBm, and may include a threshold for a valid signal, a sign-on threshold, and a neighbor maintenance threshold, with the sign-on threshold being greater than the neighbor maintenance threshold, which is greater than the valid signal threshold. In one embodiment, the sign-on threshold is about 20 dB above noise, the neighbor maintenance threshold is about 14 dB above noise, and the valid signal for decoding threshold is about 8 dB above noise. Also, the repeater configuration message can also contain a request for the repeater to send noise floor measurements to the master. Upon receiving such a request, the repeater responds with an inbound message that contains a one-byte RSSI measurement for each of the channels used by the repeater, in order, and in units of dBm. The master may then use this information in the RSSI matrix. The message field 404 in the repeater configuration message may also contain an indication that the repeater is to reassign its layer, or enroll a non-scanning two-way remote.

Another network maintenance message is a "ping-me" message. A ping me message is used to solicit a "ping" message. Such a message may be transmitted by a newly installed repeater, or a repeater which has lost touch with the network. Any repeater with a layer assignment, or the master, that receives a ping-me message transmits a "ping" reply message. This allows the originating repeater to build a neighbor list and assign itself a layer number. Two-way remote devices may also generate and transmit a ping-me message to begin the synchronization process. When a repeater receives a ping-me message, it sends a ping message on the same channel that the ping-me was received on. The ping-me message contains a message class byte 400 only, with no additional data contained in the message field 404.

When responding to a ping-me message, other repeaters, or the master, generate a ping message, which is a separate network maintenance message. Repeaters do not relay ping messages. The ping message transmitted by a repeater, or master, contains the current layer number in the layer/hop count byte 348. The ping message also contains the RSSI measurement by that repeater, or master, of the ping-me message. In one embodiment, the layer of the master is zero (0). Repeaters that do not have a layer assignment may not respond to a ping-me message. A ping is transmitted in response to a ping-me message and is transmitted on the same channel at the ping-me message using a pseudo-random delay to help prevent interference with responses from other repeaters. In one embodiment, a listen-before-talk is employed before transmitting a ping message, along with an abbreviated preamble, further helping to prevent interference with other repeaters.

Repeaters and scanning two-way remote devices maintain a neighbor list by using a neighbor check network maintenance message, which is transmitted to any neighbors already in the neighbor list of the repeater or remote device. The neighbor check message is transmitted periodically and the response of the neighbor is analyzed to determine if the radio link with that neighbor is still strong enough for that neighbor to be maintained. The responding repeater or master will include the RSSI measurement of the neighbor check message in the response, which is a point-to-point acknowledgment. The neighbor check message is a directed message which is addressed to a specific neighbor that the repeater or remote device is checking. A neighbor may be a primary neighbor or a secondary neighbor. There may be one or more primary neighbors in the neighbor list, and there may be one or more secondary neighbors in the neighbor list. In order for a neighbor to become a primary neighbor, it must be one layer below the repeater building the neighbor list, and its signal threshold must exceed the sign-on threshold. However, to remain a primary neighbor, it must still be only one layer below and its signal strength must exceed the neighbor maintenance threshold so that some signal loss or degradation that may occur over time does not cause it to be removed as a primary neighbor. A secondary neighbor may be one or more layers below the repeater building the neighbor list, and its signal threshold must exceed the neighbor maintenance threshold. If a primary neighbor, after becoming a primary neighbor, has a signal strength less than the neighbor maintenance threshold, it may be removed as a primary neighbor. A secondary neighbor may have an average RSSI which drops below the neighbor maintenance threshold and still be maintained as a secondary neighbor, so long as the average RSSI remains above the valid signal for decoding threshold.

Another network maintenance message which may be generated by a repeater or two-way remote device is a network ID configuration message. This message is used to configure the network ID of the specific repeater or two-way remote. Once the repeater or remote has been enrolled with the master, the master sends the network ID configuration message as a broadcast outbound message using a default network ID (0x00). The UID of the repeater or two-way remote is be configured is located in the trace field 360, and the new network ID is included in the message field 404. This message is transmitted several times by the master following the enrollment of the repeater or two-way remote. This message may also be sent by the master when a particular device has failed to transmit a status message during the predetermined supervision window, or at any time when a repeater or two-way remote needs to be re-configured.

A reset message may also be transmitted as a network maintenance message. A device transmits a reset message when it is powered up, or if a manual reset button is pressed. The default NID (0x00) is used to transport the message, and the NID that was recovered from the devices non-volatile memory is included in the payload layer 312 in the message field 404, along with the reset message class byte 400. This message is used as part of the registration process and is a broadcast message.

Another network maintenance message is a synchronization request message. A synchronization request message is used by non-scanning two-way remote devices to initiate a synchronization message. A non-scanning remote uses the Ping-me and Ping sequence described above to ascertain a nearby repeater which is most suitable for an entry point to the network. The non-scanning remote then uses the synchronization request message to gather the needed synchronization information from that repeater. The synchronization request is addressed to a particular repeater using the serial number of that repeater. A repeater does not relay a synchronization request message.

When a repeater receives a synchronization request message, it responds to the sending non-scanning remote a synchronization message. The synchronization message is used to transmit a timing configuration of the repeater to the non-scanning remote device. The timing configuration includes a synchronization window period, which is the amount of time between each window when a message is to be transmitted, A synchronization message may also be transmitted by a repeater upon the expiration of a synchronization window, thus acting to re-synchronize the repeater and non-scanning remote in the event that a message is not transmitted during a synchronization window. The synchronization message contains the period, in one embodiment in units of 10 milliseconds, between each window, the time until the next window, and the channel that the next window occurs on. A synchronization message, when transmitted in response to a synchronization request message, is transmitted by the repeater on the same channel that the synchronization request message was received. Once synchronized, the non-scanning remote device does not need to scan for transmissions.

In addition to network maintenance messages, devices in the network may also send message acknowledgment messages. A message acknowledgment is a message used to acknowledge that a message has been properly handed-off from one receiver or remote device to the next repeater or master, or is used as a confirmation of a neighbor check message. The message acknowledgment is a short message sent immediately upon decoding a directed message. It contains a short preamble, the network ID, the serial number of the acknowledging device, the RSSI measurement of the message being acknowledged, and the CRC of the message as computed by the acknowledging device. If the CRC is incorrect the initiating device retries the transmission. The preamble of the message acknowledgment transmission is, in one embodiment, four binary ones followed by a binary zero. This prevents other devices from locking onto the message acknowledgment transmission. In one embodiment, the device awaiting an acknowledgment allows not less than 3 milliseconds for acknowledgment to begin.

Figure 12:
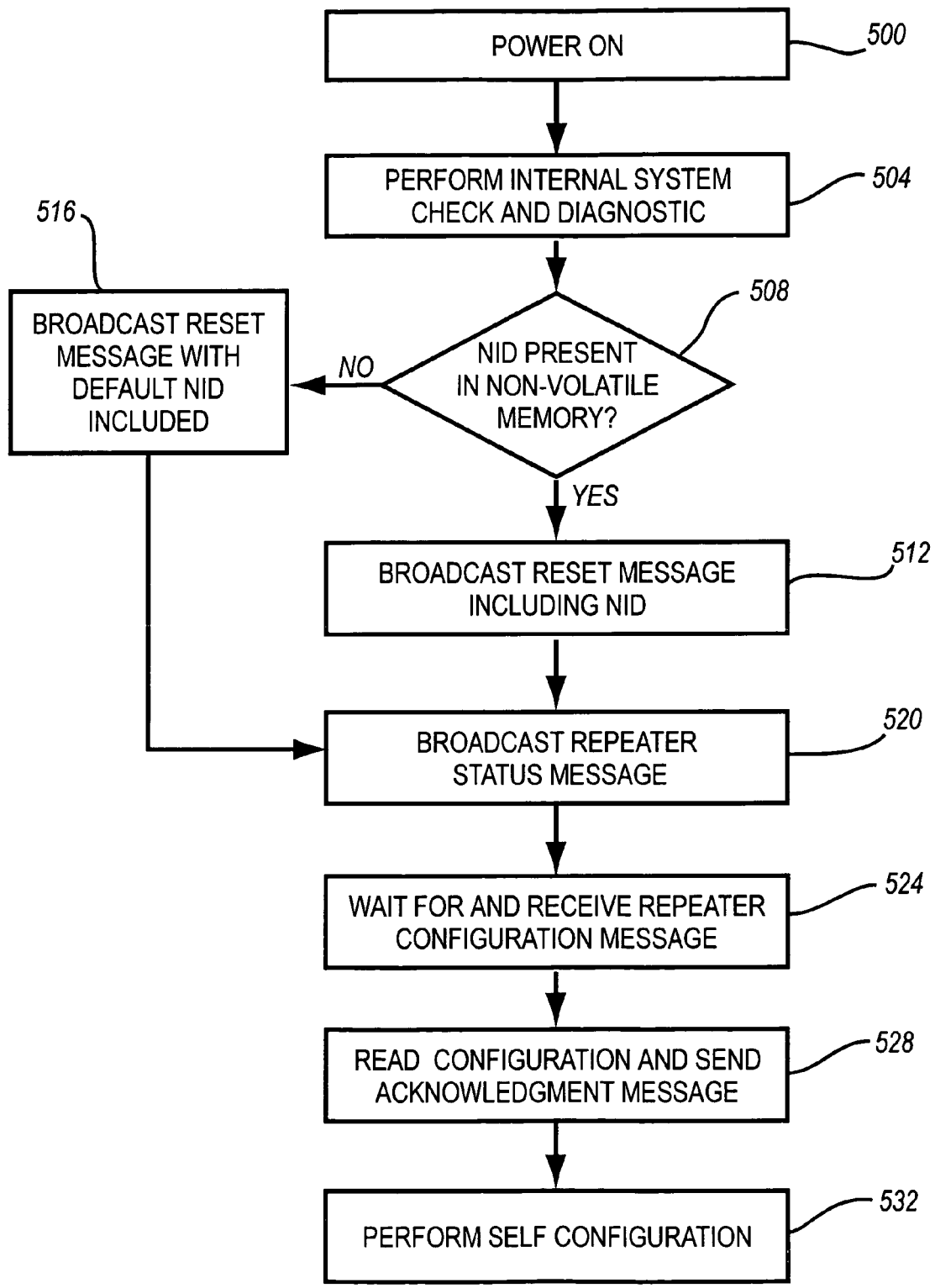
FIG. 12 is a flow chart diagram illustrating the operation of a repeater during power up and initialization for one embodiment of the present invention.

Referring now to FIG. 12, the operation of a repeater when it is powered on will now be described. Initially, as noted by block 500, the repeater is powered on. Upon being powered on, the repeater performs an internal system check and diagnostic to verify that internal components are present and communicating with each other properly, as noted by block 504. At block 508, the repeater determines if a network ID (NID) is present in non-volatile memory. If a NID is present, the repeater broadcasts a reset message which includes the NID in the payload layer of the reset message, as noted by block 512. If the repeater does not have a NID present in non-volatile memory, the repeater broadcasts a reset message which includes a default NID in the payload layer, as noted by block 516. Following the broadcast of the reset message, the repeater broadcasts a repeater status message, as noted by block 520. The repeater, at block 524, waits for and receives a repeater configuration message from the master. Upon receiving the repeater configuration message, the repeater reads the information in the message and sends an acknowledgment message back to the master, as noted by block 528. The repeater then, according to block 532, performs a self-configuration routine, which will be described in more detail below.

Figure 13:
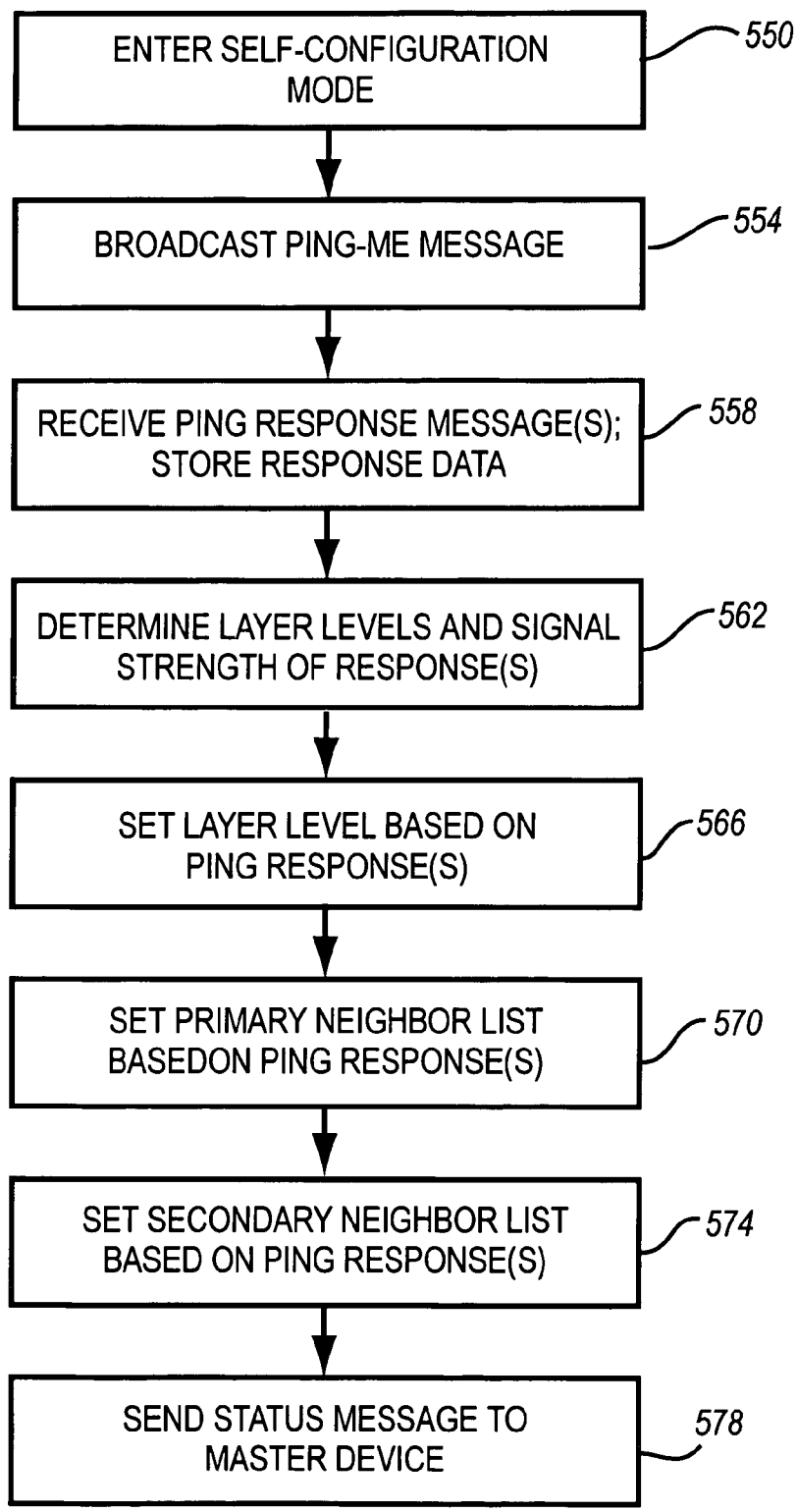
FIG. 13 is a flow chart diagram illustrating the operation of a repeater during self-configuration for one embodiment of the present invention.

Referring now to FIG. 13, the operation of a repeater during self-configuration is now described. Initially, as noted by block 550, the repeater enters into a self-configuration mode. The repeater broadcasts a ping-me message, as noted by block 554. The repeater then waits for, and receives ping response messages, as noted by block 558. As mentioned above, the ping response messages include information on the signal strength of the received ping-me message as well as the layer number and network ID of the responding device. The repeater decodes the ping messages received, and stores the response data in memory, as also is noted by block 558. The repeater, at block 562, determines the layer levels and the signal strength of the responses. At block 566, the repeater sets its layer level based on the ping messages. The layer level is set such that the layer for the repeater is one higher than the lowest layer which the repeater receives a response which has a signal level which was greater than the sign-on threshold. The repeater, at block 570, sets a primary neighbor list based on the ping responses. As mentioned above, primary neighbors are set to be devices which have signal values which exceed the sign-on threshold and are in the layer immediately lower than the layer of the repeater. The repeater also sets a secondary neighbor list based on the ping responses, as noted by block 574. The secondary neighbor list, as mentioned above, contains repeaters which may be one or more layers below the repeater. Next, at block 578, the repeater sends a repeater status message to the master.

Figure 14:
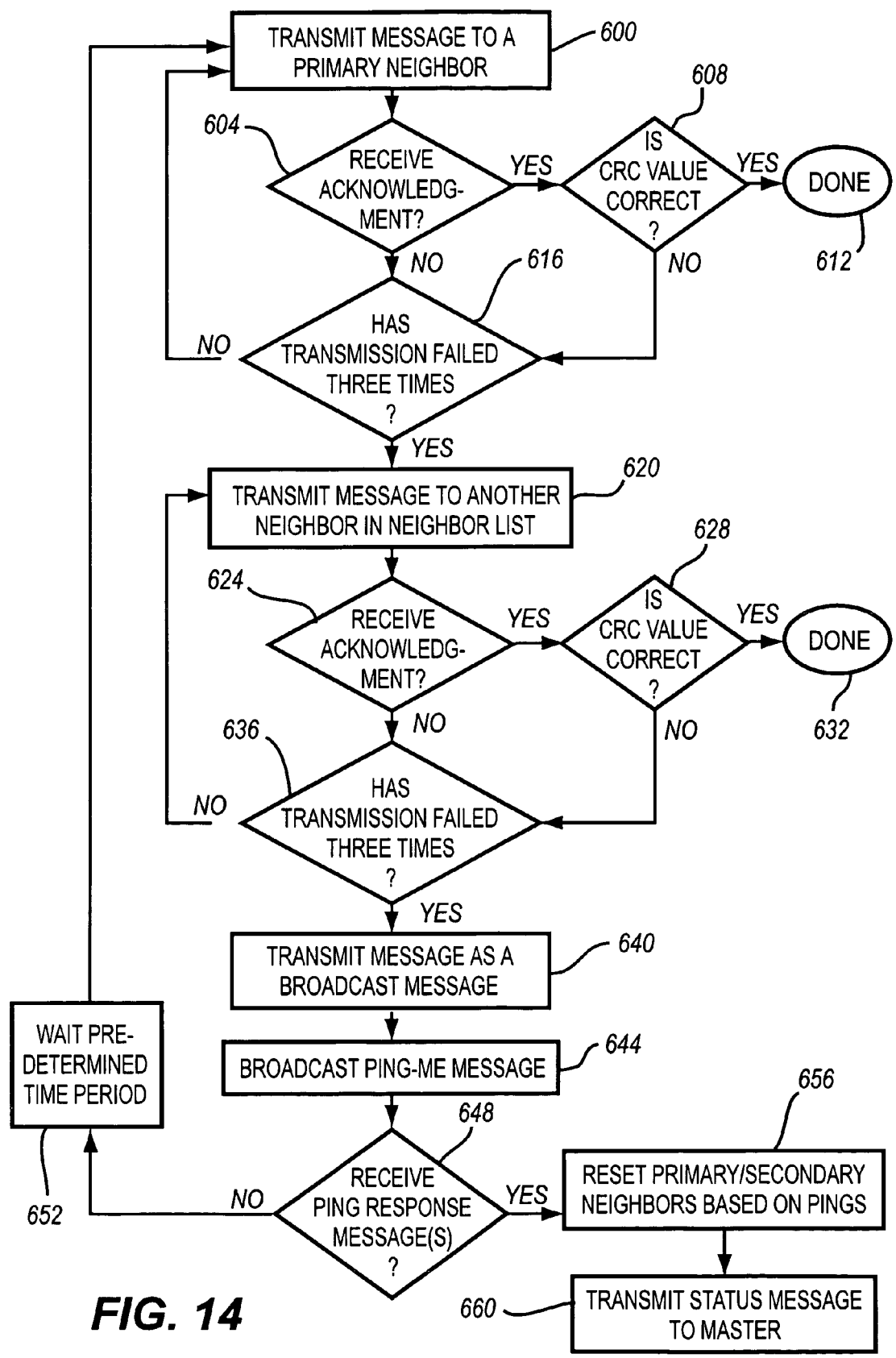
FIG. 14 is a flow chart diagram illustrating the operation of a message transmission for a repeater for one embodiment of the present invention.

Referring now to FIG. 14, the operation of a device when transmitting a message is now described. Initially, as noted by block 600, the device transmits a message to a primary neighbor. Following the transmission, the device waits a predetermined time period to determine if it receives an acknowledgment signal, as noted by block 604. If an acknowledgment signal is received, the device determines if the CRC value of the acknowledgment is correct, as noted by block 608. If the CRC value is correct, the operation is complete, as noted by block 612. If the CRC value in the acknowledgment is not correct, or if no acknowledgment is received, the device determines if the transmission has failed three times, as noted by block 616. In one embodiment, the device tracks the number of transmission attempts using a counter. If the transmission has not failed three times, the operations according to blocks 600 through 616 are performed again. It will be understood that the number of attempts at a transmission can be any preset number of attempts which may be more, or fewer, than three attempts.

If the transmission has failed three times, the device transmits the message to another neighbor, as noted by block 620. Following the transmission, the device waits a predetermined time period to determine if it receives an acknowledgment signal, as noted by block 624. If an acknowledgment signal is received, the device determines if the CRC value of the acknowledgment is correct, as noted by block 628. If the CRC value is correct, the operation is complete, as noted by block 632. If the CRC value in the acknowledgment is not correct, or if no acknowledgment is received, the device determines if the transmission has failed three times, as noted by block 636. If the transmission has not failed three times, the device conducts the operations associated with blocks 620 through 636 again. If the transmission has failed three times, the message is converted to a broadcast message that is received or heard by all within its ranges as noted by block 640. Subsequently, the device, according to block 644, broadcasts a ping-me message. At block 648, the device determines whether and ping response messages have been received. If no ping response messages are received, the device waits a predetermined time period, noted in block 652, and repeats the operations associated with blocks 600 through 640. If ping response messages are received, as noted by block 656, the device resets its primary/secondary neighbors based on the ping response messages received. The device, at block 660, transmits a status message to the master.

Figure 15:
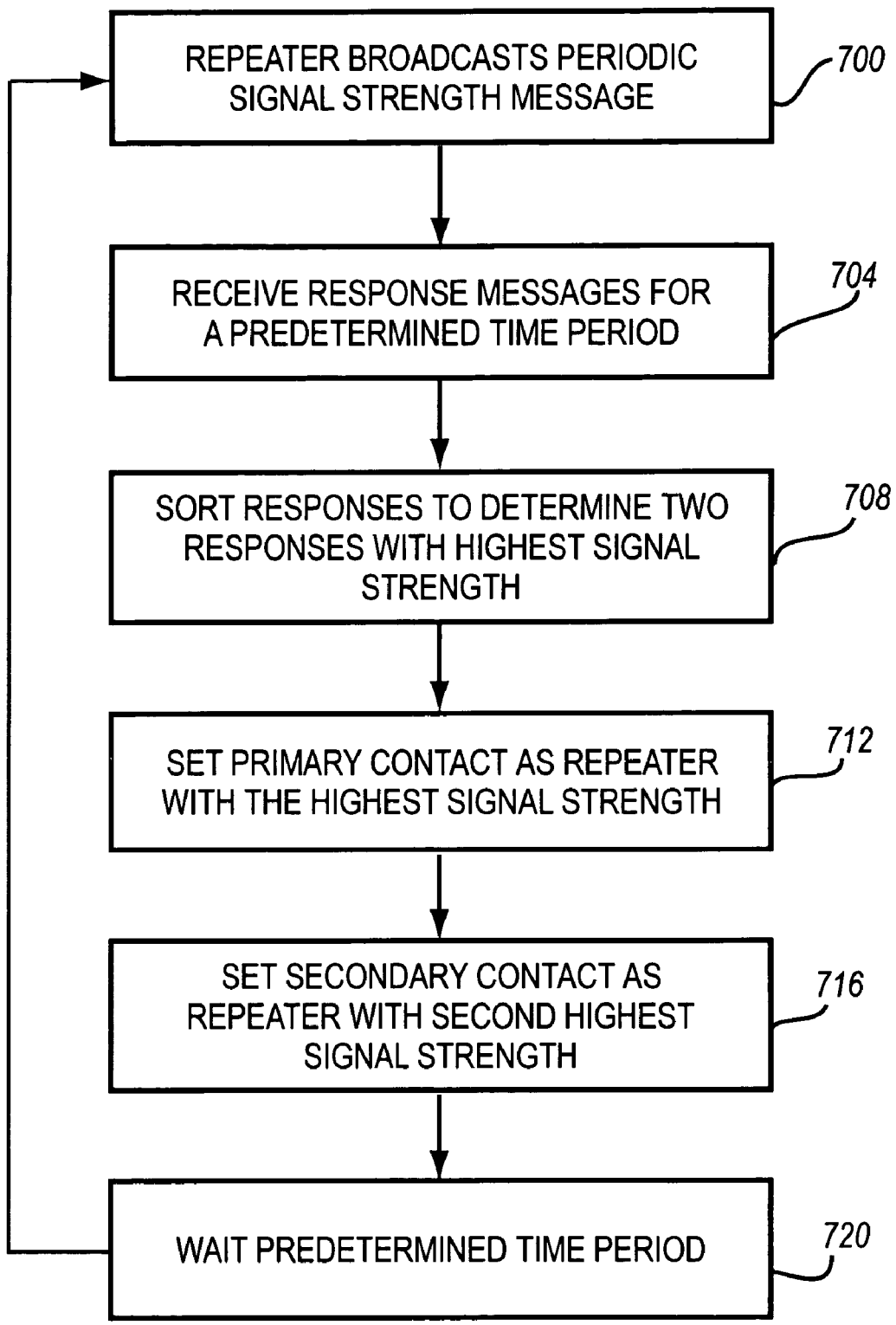
FIG. 15 is a flow chart diagram illustrating the operation of a periodic neighbor communications check for a repeater for one embodiment of the present invention.

Referring now to FIG. 15, the operation of a repeater when verifying the signal strength of its neighbors is now described. Initially, at noted by block 700, a repeater broadcasts a periodic signal strength message. In one embodiment, the signal strength message is a ping-me message. At block 704, the repeater then receives response messages for a predetermined time period. Next, at block 708, the repeater sorts through the received responses to determine the responses with the lowest layer level which have a signal strength greater than the sign-on threshold level. At block 712, the repeater sets a primary neighbor list as the repeaters which qualify as primary neighbors. At block 716, a secondary neighbor list is set to include repeaters which qualify as secondary neighbors. The repeater then operates using the primary/secondary contacts, and at the expiration of a predetermined time period, as noted by block 720, repeats the operations associated with blocks 700 through 720.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A wireless communications system, comprising:
   a data packet, wherein said data packet includes:
   a transport layer, wherein said transport layer includes a preamble having at least a first predetermined length;
   a control layer, wherein said control layer includes at least one bit indicating that a particular type of additional data is included in said data packet;
   a first sending device having a wireless data transmitter to transmit said data packet; and
   a first receiving device having a wireless data receiver to receive said data packet; wherein said preamble includes channel identification information.

2. The system of claim 1, wherein said data packet additionally includes a payload layer.

3. The system of claim 1, wherein said preamble includes a number of synchronization bits.

4. The system of claim 1, wherein said at least a first predetermined length of said preamble is at least as long as a scan time of said first receiving device.

5. The system of claim 1, wherein said at least a first predetermined length of said preamble is at least 8 milliseconds.

6. A wireless communications system, comprising:
   a data packet, wherein said data packet includes:
   a transport layer, wherein said transport layer includes a preamble having at least a first predetermined length;
   a control layer, wherein said control layer includes at least one bit indicating that a particular type of additional data is included in said data packet;
   a first sending device having a wireless data transmitter to transmit said data packet; and
   a first receiving device having a wireless data receiver to receive said data packet;
   wherein said transport layer of said data packet additionally includes a synchronization frame, wherein said synchronization frame includes network identification information.

7. The system of claim 6, wherein one of said sending device and said receiving device comprises a master device having a first identifier, wherein said network identification information comprises at least a first valid value, and wherein said first valid value is related to said first identifier of said master device.

8. The system of claim 6, further comprising at least a first repeater having a wireless data receiver and a wireless data transmitter, wherein said network identification information of said synchronization frame of said data packet comprises at least a first valid value, said first valid value comprising a default value, wherein said repeater device operates to retransmit said data packet having said network identification information comprising said first valid value.

9. The system of claim 8, wherein said at least a first valid value comprises a default network identification.

10. The system of claim 6, wherein said network identification information includes a frequency band indication.

11. The system of claim 6, wherein said data packet includes signal strength information related to a strength of a signal received by said first sending device from one of said first receiving device and a second sending device.

12. The system of claim 1, wherein said data packet includes signal strength information related to a strength of a signal with respect to a receiving device and an identification of one of a repeater and a sending device that transmitted said signal.

13. The system of claim 1, wherein said control layer of said data packet includes at least one bit indicating a priority of said data packet.

14. The system of claim 1, wherein said data packet includes address information identifying a target receiving device.

15. The system of claim 1, wherein said control layer includes a survey bit, wherein said survey bit indicates when set that additional data comprising signal strength data is included in said data packet.

16. The system of claim 1, wherein said control layer includes a layer bit, wherein said layer bit indicates when set that additional data identifying a layer of a transmitting device is included in said data packet.

17. The system of claim 1, wherein said control layer includes an addressed bit, wherein said addressed bit indicates when set that additional data comprising an identifier of a device to which said data packet is directed is included in said data packet.

18. The system of claim 1, wherein said control layer includes a trace bit, wherein said trace bit indicates when set that additional data comprising trace information is included in said data packet.

19. The system of claim 1, wherein said control layer includes a direction bit, wherein said direction bit indicates when set that said data packet is directed one of inbound toward a master and outbound away from said master.

20. A wireless communication method, comprising:
forming a first data packet comprising a preamble and a plurality of control bits;
wirelessly transmitting said first data packet from a first transmitter;
scanning for transmitted data packets at a first receiver, wherein a scan rate of said first receiver is no greater than a length of said first data packet preamble; receiving said wirelessly transmitted first data packet at said first receiver; determining at said first receiver a signal strength associated with said wireless transmission of said first data packet; and
reporting said determined signal strength associated with said wireless transmission of said first data packet to a master device.

21. The method of claim 20, further comprising:
forming a second data packet comprising a preamble and a plurality of control bits;
wirelessly transmitting said second data packet from a second transmitter;
receiving said wirelessly transmitted second data packet at said first receiver;
determining at said first receiver a signal strength associated with said wireless transmission of said second data packet; and
reporting said determined signal strength associated with said wireless transmission of said second data packet to said master device.

22. The method of claim 20, further comprising:
forming a second data packet comprising a preamble and a plurality of control bits;
wirelessly transmitting said second data packet from said first transmitter;
receiving said wirelessly transmitted second data packet at a second receiver;
determining at said second receiver a signal strength associated with said wireless transmission of said second data packet; and
reporting said determined signal strength associated with said wireless transmission of said second data packet to said master device.

23. The method of claim 22, further comprising
forming a third data packet comprising a preamble and a plurality of control bits, wherein said plurality of control bits include at least a first address bit; and
wirelessly transmitting said third data packet from said first transmitter to said first receiver, wherein said determined signal strength associated with said wireless transmission of said first data packet is greater than said determined signal strength associated with said wireless transmission of said second data packet, and wherein said third data packet is addressed to said first receiver.

24. The method of claim 23, wherein said first transmitter is a repeater, and wherein said forming a third data packet is performed by said master device.

25. The method of claim 20, wherein said first data packet further includes a survey bit, wherein said survey bit is set when a data packet contains signal strength information.

26. The method of claim 25, wherein said signal strength information includes a received signal strength indicator value and an identifier associated with a receiving device that determined said received signal strength.

* * * * *